2 Sheets—Sheet 1.

A. R. GUILDER.
Middlings Purifier.

No. 8,386. Reissued Aug. 20, 1878.

WITNESSES

Robert Everett

George E. Upham.

INVENTOR.

A. R. Guilder.

Gilmore & Smith & Co.

ATTORNEYS.

N. PETERS, PHOTO-LITHOGRAPHER, WASHINGTON, D. C.

A. R. GUILDER.
Middlings Purifier.

No. 8,386. Reissued Aug. 20, 1878.

WITNESSES

Robert Everett

George E. Upham.

INVENTOR.

A. R. Guilder.

Gilmore & Smith & Co.

ATTORNEYS.

N. PETERS, PHOTO-LITHOGRAPHER, WASHINGTON, D. C.

UNITED STATES PATENT OFFICE.

ABSALOM R. GUILDER, OF MINNEAPOLIS, MINNESOTA.

IMPROVEMENT IN MIDDLINGS-PURIFIERS.

Specification forming part of Letters Patent No. 155,374, dated September 29, 1874; Reissue No. 8,386, dated August 20, 1878; application filed December 2, 1876.

*To all whom it may concern:*

Be it known that I, ABSALOM R. GUILDER, of Minneapolis, in the county of Hennepin and State of Minnesota, have invented a new and valuable Improvement in Middlings-Purifiers; and I do hereby declare that the following is a full, clear, and exact description of the construction and operation of the same, reference being had to the annexed drawings, making a part of this specification, and to the letters and figures of reference marked thereon.

Figure 1:
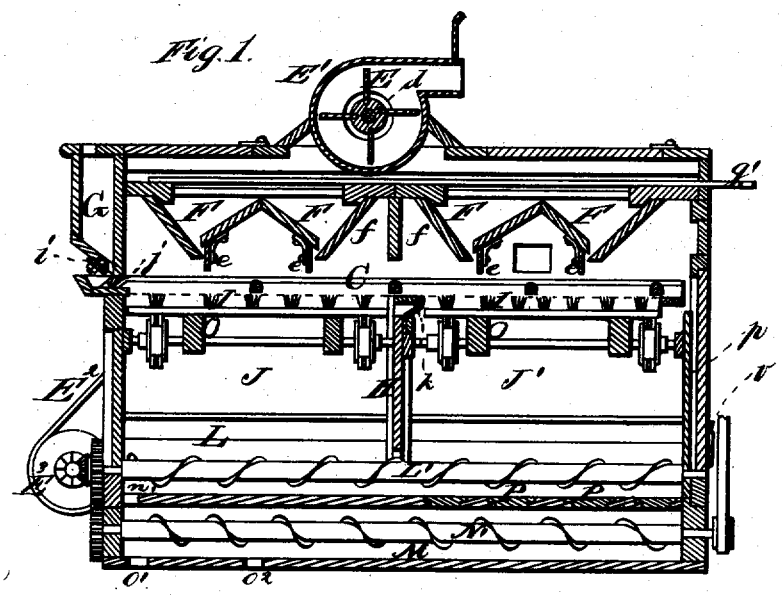
Figure 2:
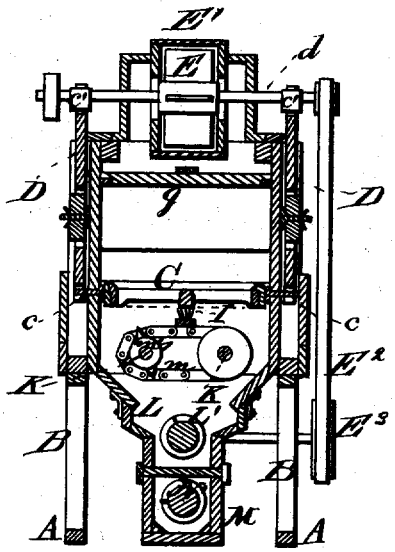
Figure 3:
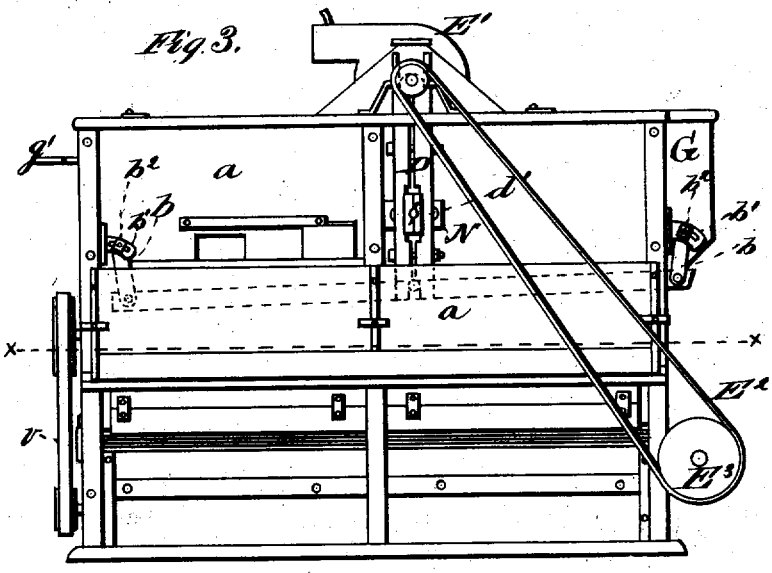
Figure 4:
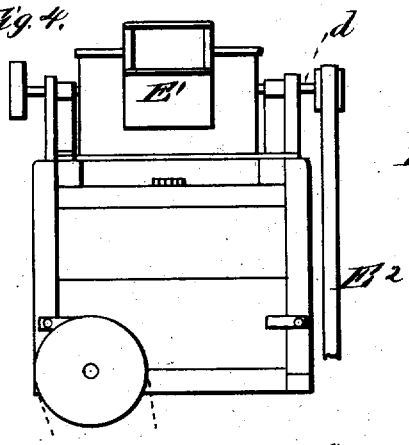
Figure 5:
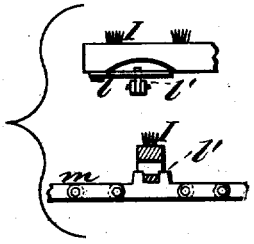

Figure 1 of the drawings is a representation of a longitudinal vertical section of my middlings-purifier. Fig. 2 is a transverse vertical sectional view of the same. Fig. 3 is a side view of the said middlings-purifier. Fig. 4 is an end view of the same. Figs. 5, 6, 7, 8, and 9 are detail views.

This invention has relation to machines for purifying flour and middlings wherein a suction-fan and adjustable suction-spouts are arranged over a riddle and endless conveyers are arranged beneath the riddle.

The nature of my invention consists in novel means for giving such a velocity to the riddle that the meshes of the cloth will be kept open for uniformly riddling the flour, said means consisting in slotted levers and adjustable blocks for the purpose of shortening or lengthening the strokes given to the riddle.

It also consists in the peculiar construction of said levers, whereby they are adapted to take up the wear of the eccentrics upon their upper ends, so as to be always in condition to operate.

It also consists in the employment of detachable brush-carriers or brush-holders, which hold the brushes in contact with the under side of the riddle during the upper part of their revolution.

It also consists in giving to the said brushes a continuous transverse motion across the bottom of the said riddle.

It also consists in a novel means of attaching the brush-heads to their endless-chain carriers, whereby these heads can be conveniently detached from the chains without disturbing the riddle.

It consists, finally, in the various combinations of the above parts, and in sundry other devices hereinafter particularly set forth.

In the annexed drawings, A designates the sills of the main frame, and B the uprights thereof, which are firmly united by horizontal beams. The walls of the frame are closely housed in by means of boards *a*, which are made removable at such parts as to afford access to the interior of the machine. This frame is divided horizontally at the line *x x*, and the horizontal beams at the place of division are secured together by means of bolts, by removing which the two sections composing the frame can be separated and conveniently transported.

C designates a shaker or riddle frame, which is longitudinally and centrally divided, and which has secured to it cloth of different degrees of fineness. This shaker or riddle C is hung at its four corners by means of links *b*, which are pivoted to segmental curve-slotted brackets $b^1$ by means of pivot-clamps $b^2$, which are adjustable therein. This adjustment regulates the longitudinal inclination of the riddle.

I desire to give the riddle C a very rapid motion—say from six hundred to twelve hundred vibrations per minute—and to this end I employ two levers, D D. The lower long slotted ends of said levers receive and operate wrist-pins *c c*, which are fixed into the riddle-frame C at or near the middle of its length, and the upper long slotted ends of said levers embrace eccentrics *c′ c′*, which are keyed on the shaft *d* of a fan, E, which receives motion from a driving-shaft by means of a belt, $E^2$, and pulley $E^3$. (Shown in Fig. 3.) By thus employing two eccentrics and levers I am enabled to give to each side of the riddle an even positive motion.

Figure 6:
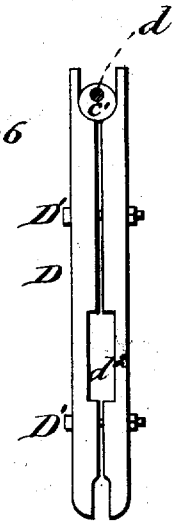
Figure 9:
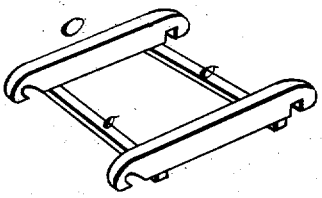
Figure 9:
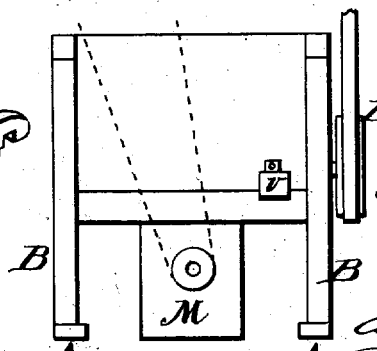
Figure 7:
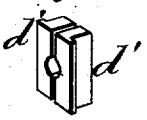
Figure 8:
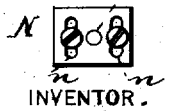

In order to take up the wear of eccentrics *c′ c′* on the slotted or recessed upper ends of levers D D, each one of said levers is divided centrally and longitudinally, as shown in Figs. 3 and 6, so as to be in two sections, which are adjustable by means of clamping-bolts D′ and their nuts. By clamping said sections more tightly together the lateral wear of said eccentrics on the recessed upper ends of said levers is taken up.

In order to similarly take up the wear by the eccentric at the bottom of the said recess or slot of each one of said levers, I make said levers and their fulcrums vertically adjustable together. This is effected by providing each attaching-plate N (shown in detail in Fig. 8) with vertical slots *n n*, through which slots pass the set-screws *n′ n′*, that secure said plate to the main frame A of the machine. Said attaching-plate N is rigidly connected to the fulcrum-block $d^1$ of one of said levers D by means of metal pin N′. The arrangement of said plates, fulcrum-blocks, and levers is substantially the same on each side of said machine. Said fulcrums $d^1$ $d^1$ (shown in detail in Fig. 7) are blocks of rectangular shape, and set within similarly-shaped vertical slots $d^2$ $d^2$ in said levers D D. Said levers can be adjusted vertically over said fulcrums, so as to lengthen or shorten the strokes given to the riddle C. Above said riddle is a fan, E, working in a box, $E^1$, on top of the machine. Beneath the said fan-box are a number of chambers, F, having valves *e* in their bottoms and adjustable slides *g* applied over them.

The valves *e* will open from time to time and discharge any material which may have accumulated in them, as described in my Letters Patent numbered 145,170.

The slides *g* are designed for regulating the force of the exhaust, and these slides are adjustable over ascending passages *f* by means of rods *g′*.

G designates the hopper, which is provided with an opening through its upper end, that will be suitably closed when not admitting into it the material to be treated. The lower end of this hopper is provided with an adjustable strip, *i*, and also an inclined deflecting-board, *j*. The strip *i* is designed for regulating the feed, and the board *j* prevents a direct influx of air when the hopper-door is opened. It also operates to distribute the material evenly upon the head of the riddle.

Beneath the riddle C is a transverse division, H, which is flexibly connected to the riddle by a strip, *k*, and which leaves a space, J, on one side of it for the material which passes first through the riddle, and a space, J′, for the coarser material which passes afterward. This flexible connection of said partition H maintains at all times an air-tight separation between said spaces J and J′, and still does not interfere with the movements of said riddle. In each space or compartment J or J′ are single-row dusting-brushes I, which are arranged to sweep across the bottom of the riddle-cloth from side to side, so that they move at right angles to the material in its passage over the riddle, thus avoiding mixing the different grades of the material and keeping the cloth clear.

This mixing of the different grades of middlings is caused by the traveling brushes and endless aprons moving in the longitudinal direction of the riddle or shaker, said brushes and aprons carrying the coarser middlings with them in their movement and depositing them into the compartment containing the finer middlings.

It will also be observed that the brushes I move transversely across the entire under surface of the riddle or shaker independently of the movement of said riddle, whereby the mixing of the different grades of middlings is prevented.

By imparting a rotary motion to the brushes arranged on endless apron or aprons they become self-cleaners, the particles of the middlings adhering to the brushes and aprons as they pass under the riddle or shaker falling off as they become inverted in the movement of the apron.

The brush-heads are attached by means of fingers *l l* to eyes *l′ l′* on endless chains *m m*, applied around sprocket-wheels *m′ m′* on horizontal shafts K K. Said brushes are held in contact with the under side of said riddle during the upper part of their revolution by means of brush-guides or brush-holders O. (Shown in detail in Fig. 9 and in section in Fig. 1.) Said holders consist of two bars, rounded at their corners, connected by cross-pieces *o o*, and recessed underneath near their ends, so that they may be supported and held in position by the said sprocket-wheel shafts K K. The said holders are easily detachable therefrom.

The finest material falls through the compartment J into a trough, L, and is moved by means of a conveyer, L′, through an opening, *n′*, into a trough, M, in which there is a conveyer, N′, that discharges the fine material through an opening, $o^1$. The coarser material, which falls through the compartment J′ on the opposite side of the partition H, is received into a part of the said trough L, which has a number of slide-valves, P, in its bottom, by means of which any desired grade of flour can be obtained. The material which is drawn off by the valves P falls into the trough M, and is discharged by the conveyer N′ through the opening $o^2$.

The refuse material is discharged from the riddle into a vertical passage, *p*, and thereby conducted out of the machine through an opening which is provided with a valve, *v*.

The brush-heads I are detachable from endless chains *m m* by simply sliding the sprocket-wheels *m′ m′* to one side, which avoids disturbing the riddle when it is desired to remove the brushes.

What I claim as new, and desire to secure by Letters Patent, is—

1. In a middlings-purifier, the combination of a reciprocating shaker or riddle with a dusting-brush traveling continuously at right angles to the flow of material, substantially as set forth.

2. In combination with a suction-fan, a reciprocating riddle and an independent continuously and transversely traveling brush, substantially as set forth.

3. In a middlings-purifier, the combination of brushes carried by endless chains with a brush-holder or brush-guide, substantially as described.

4. The combination, with a reciprocating riddle or shaker, of a brush moving transversely across the entire under surface of the riddle and independently of the movement of said riddle, substantially as and for the purpose set forth.

5. The combination, with a reciprocating riddle, of a rotating brush moving transversely across the under surface of the riddle and independently of the movement of the riddle, whereby the different grades of middlings are not mixed together and the brush cleans itself in its revolutions, substantially as described.

6. In a middlings-purifier, detachable brush-guides or brush-holders O, recessed underneath near their ends to saddle the sprocket-wheel shaft K, substantially as and for the purpose set forth.

7. The combination, in a middlings-purifier, of eccentrics $c'$ $c'$, levers D D, with their adjustable fulcrums, and a reciprocating riddle, whereby a positive motion is given to the riddle on both sides thereof.

8. In a middlings-purifier, levers D D, longitudinally divided, and provided with clamping bolts and nuts for the purpose of taking up wear, substantially as set forth.

9. The combination of fulcrum-blocks $d^1$ with lever D, slotted at $d^2$, substantially as and for the purpose set forth.

10. In a middlings-purifier, the vertical levers D D, adjustable relatively to their fulcrums so as to lengthen or shorten the stroke given to the riddle, substantially as set forth.

11. The fingers $l$ on brush-heads I, combined with eyes $l'$ of chains $m'$, substantially as set forth.

12. In a middlings-purifier, a fan-shaft provided at each end with an eccentric, substantially as set forth.

13. In a middlings-purifier, flexible apron $k$ and partition H, in combination with compartments J and J′, substantially as set forth.

In testimony that I claim the above I have hereunto subscribed my name in the presence of two witnesses.

ABSALOM R. GUILDER.

Witnesses:
D. D. KANE,
GEORGE E. UPHAM.